Feb. 21, 1956 W. J. TURNER 2,735,113
AUTO BED FOR INFANT
Filed Jan. 2, 1953 2 Sheets-Sheet 1

INVENTOR.
WILLIAM J. TURNER
BY
Jerome R. Cox
ATTORNEY

Feb. 21, 1956     W. J. TURNER     2,735,113
AUTO BED FOR INFANT

Filed Jan. 2, 1953                           2 Sheets—Sheet 2

INVENTOR.
WILLIAM J. TURNER
BY
*Jerome R. Cox*
ATTORNEY

United States Patent Office 2,735,113
Patented Feb. 21, 1956

2,735,113

AUTO BED FOR INFANT

William J. Turner, Mount Gilead, Ohio

Application January 2, 1953, Serial No. 329,325

1 Claim. (Cl. 5—94)

The invention illustrated, described and claimed in this application relates to a device useful as an enclosure and as a bed for children. The device illustrated is useful in many ways, as for example, in the home, but it is especially adapted to be associated with the rear seat of an automobile. Many devices of this character have heretofore been proposed but I consider that the device which I have designed and disclosed herein is an improvement over anything heretofore accomplished or provided as will be clear later in the description thereof.

An enclosure constructed according to my invention when used in an automobile may be associated with a rear seat of an automobile in order to keep a young child from harm while giving him a substantial measure of freedom and complete comfort. I have found that cribs, of which there are many types, such as those for example which may be suspended from the top of an automobile are satisfactory for very young children, but after the child has grown to a larger size and a more active stage, such an enclosure is neither safe nor comfortable. Devices constructed according to my invention may be quickly adapted to any standard make of automobile without the use of tools or the like and without demanding any structural change or defacement of the automobile. It is, of course, obvious that it is desirable that the supporting or mattress portion of such a device should be substantially horizontal and that the enclosure portion thereof should be substantially vertical. It is important that these members be respectively horizontal and vertical irrespective of the angles formed by the seat cushion with each other or with the car. In this connection it may be noted that there are marked differences in seat dimensions and angles in the different types of automobiles and in different makes thereof, and also in the different models put out by the same manufacturers in different years and in the same year. I have so designed my enclosure that embodiments thereof can be used by a car owner with a plurality of automobiles or with any automobile which he may happen to have. Devices constructed according to my invention may be removed from the automobile easily, folded and stored. They may then be reinserted either in the same automobile or in a different automobile.

One of the objects of my invention therefore is to provide an enclosure and bed.

A further object is the provision of such an enclosure and bed which is practical for use not only for use in the home, but also is practical for use with the rear seat of an automobile and is safe and comfortable for the use of children therein even after they have passed infancy.

Another object of my invention is to supply such an enclosure and bed which can be adjusted for use with various automobiles, thus effecting great economy for the manufacturer, dealer, and user alike, without any sacrifice of efficiency, rigidity and strength.

Another object is to supply an enclosure which may be folded when not in use so as to occupy very little space.

A further object is to supply such an enclosure in which the supporting surface is positioned horizontally and in which the walls are positioned vertically regardless of the angle of the seat or the back cushion with which they are used.

A special feature of the embodiment of my invention illustrated is the provision of a pair of relatively long legs which are designed to rest upon the floor of the automobile and a pair of relatively short legs which are designed to rest upon the seat of the automobile.

A further feature of my invention is the provision of means for adjusting the length of both of these sets of legs so that the angle of the enclosure member is proper regardless of the angle of the seat of the automobile itself and of the backs of the seat of the automobile.

Further objects and features of my invention will be apparent from the subjoined specification and claim when considered in connection with the accompanying drawings in which there is illustrated an embodiment of my invention.

Figure 3:
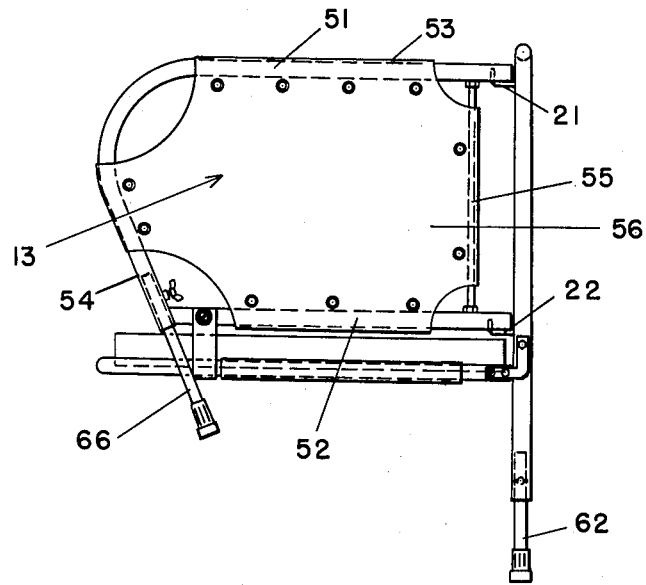
Fig. 3 is an end view of the bed of Fig. 1 when it is set up for use.

The bed of the drawings itself consists of a front section 11, a seat or bottom section 12, and two end sections 13 and 14. Each of these sections consists of a tubular frame and a canvas sheet fastened around the frame. The end sections 13 and 14 and the seat section 12 are each pivotally connected to the back seat section 11. The seat section is pivoted on angle braces such as 15 while the end sections are pivoted on hooks secured to the back section such as hooks 21 and 22 (shown best in Fig. 3).

The front section 11 as shown consists of a tubular member 31 bent in the form of a U, the extremities 32 and 33 forming portions of the longer legs as will be later described more clearly. Secured to this U-shaped tubular member 31 by suitable means such as for example, the buttons 34, is a covering member or sheet 35. The buttons 34 are shown as secured to the covering member 35 and extend through eyelets formed in another portion of the covering member 35. The buttons could, if desired, be secured to the tubular members. A rod 36 extends through openings in the legs of the tubular member 31 and through a loop or hem formed in the lower end of the covering member 35. This rod is positioned at the lower end of the covering member 35 but above the extremities 32 and 33 and thus is positioned intermediate the top and bottom of the tubular member 31.

The seat or bottom section 12 as shown consists of a U-shaped tubular member 41 having a back rail or portion 42, and two legs 43 and 44. Joining the two leg portions 43 and 44 is a rod 45 which is similar to the rod 36 and similarly passes through a hem in the canvas covering member 37. The angle braces 15 are secured to the extremities of the leg portions 43 and 44 and to the rod 45 so that such angle braces 15 turn with the seat section 12. They are pivoted on the bolted ends of the rod 36.

The end sections 13 and 14 are identical and description of one should suffice for both. Section 14 consists of an L-shaped tubular member 51 and a shorter straight tubular member 52 welded or otherwise secured thereto. The L-shaped tubular member 51 consists of a shorter leg 53 and a longer leg 54. To the outer end of leg 53 there is secured a rod 55 which at its opposite end is secured to the end of the straight tubular member 52 opposite to its junction with the L-shaped member 51. The rod 55 passes through a hem in the canvas covering member 56, buttons and eyelets being provided to secure the covering 56 to the members 51, 52 and 55. The tubular sections may be of metal or other suitable material. The covering may be of canvas or other suitable material.

The extremities 32 and 33 of the tubular section 31 of the front section 11 are provided with two adjustable foot members 61 and 62, these foot members telescoping into the tubular members 32 and 33 and being held in adjusted position in the ends of the extremities by thumb screws 63 and 64. The end sections are provided with adjustable foot members such as 65 and 66 which telescope into the ends of the legs 54 of the L-shaped member 51. These foot members are also adjustably held in position as for instance by thumb screws similar to 63 and 64. These foot members 65 and 66 are effectively much shorter than the legs 61 and 62 inasmuch as when the device is set up in an automobile, the foot members 65 and 66 rest upon the seat of the automobile while the foot members 61 and 62 rest upon the floor of the automobile. A mattress 71 is provided with fits on the canvas of the seat 12.

I prefer to provide an adjustable foot member for each of the tubular frame members 32, 33 and 54, but in certain cases I may find it desirable to dispense with one pair of foot members inasmuch as in the majority of cases the function of the adjustment of the legs is to insure that the seat of the enclosure is level. In some cases, however, I find it necessary to make all four foot members adjustable.

Figure 1:
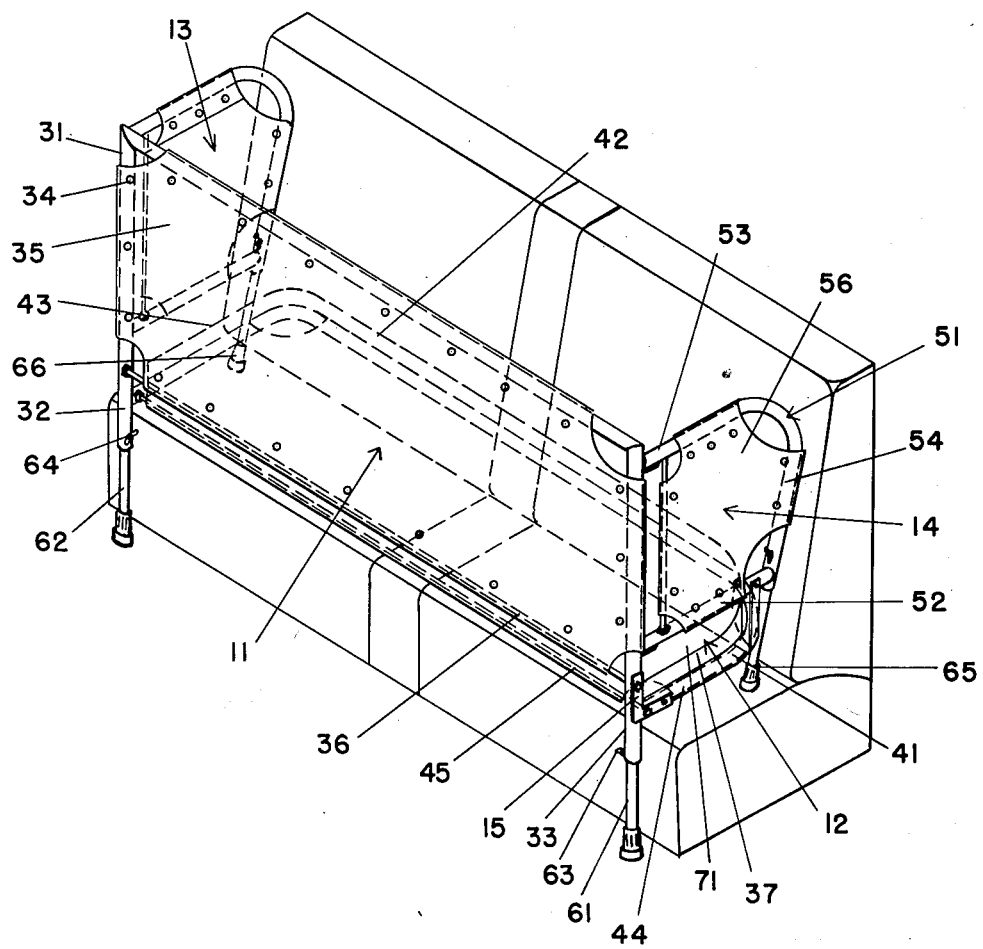
Fig. 1 is a view in perspective of a bed which constitutes one embodiment of my invention, set up in the back seat of an automobile.
Figure 2:
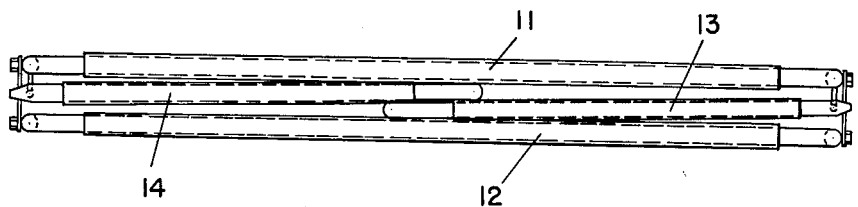
Fig. 2 is a plan view of the bed of Fig. 1 when folded for storage.

As is obvious, the device may be folded in the form shown in Fig. 2 for carrying and as is also obvious, when used in an automobile, the back seat of the automobile and the back cushions thereof form the fourth side of the enclosure.

It is to be understood that the above described embodiment of my invention is for the purpose of illustration only and various changes may be made therein without departing from the spirit and scope of the invention.

I claim:

For use on the seat of an automobile which has a floor, said seat having a substantially horizontal seat member, and having a back member disposed substantially vertically but slanting backward as it extends upward from the seat member, an improved device serving as an enclosure and as a bed and comprising a tubular front section metal frame extending substantially vertically, having side tubular frame members and a top tubular frame member; a pair of L-shaped tubular members having a horizontal portion pivoted to the front section about a substantially vertical axis and having a slanting portion extending downward in a direction substantially parallel to the slant of the back member of the seat; a seat section tubular metal frame pivoted to the front section about a horizontal axis; individual covers in stretched condition secured to each of said sections, each cover being formed with a hem along each of its edges; a rod extending through each of said tubular frames and through one of said hems; a pair of relatively long leg sections formed as continuations of the side frame members of said front section; an adjustable foot member adjustably secured to each of said long leg sections and contacting with the floor of said automobile; a pair of relatively short leg sections formed as continuations of the slanting tubular portion of each of the side sections; and an adjustable slanting foot member adjustably secured to each of said short leg sections and contacting with the seat of said automobile.

References Cited in the file of this patent

UNITED STATES PATENTS

| | | |
|---|---|---|
| 1,200,830 | Goss | Oct. 10, 1916 |
| 2,048,955 | Showalter | July 28, 1936 |
| 2,247,598 | Bohlen | July 1, 1941 |
| 2,493,181 | Andersen | Jan. 3, 1950 |
| 2,583,187 | Newbern | Jan. 22, 1952 |
| 2,606,328 | Finkle | Aug. 12, 1952 |

FOREIGN PATENTS

| | | |
|---|---|---|
| 339,085 | Great Britain | Dec. 4, 1930 |